Figure 1:
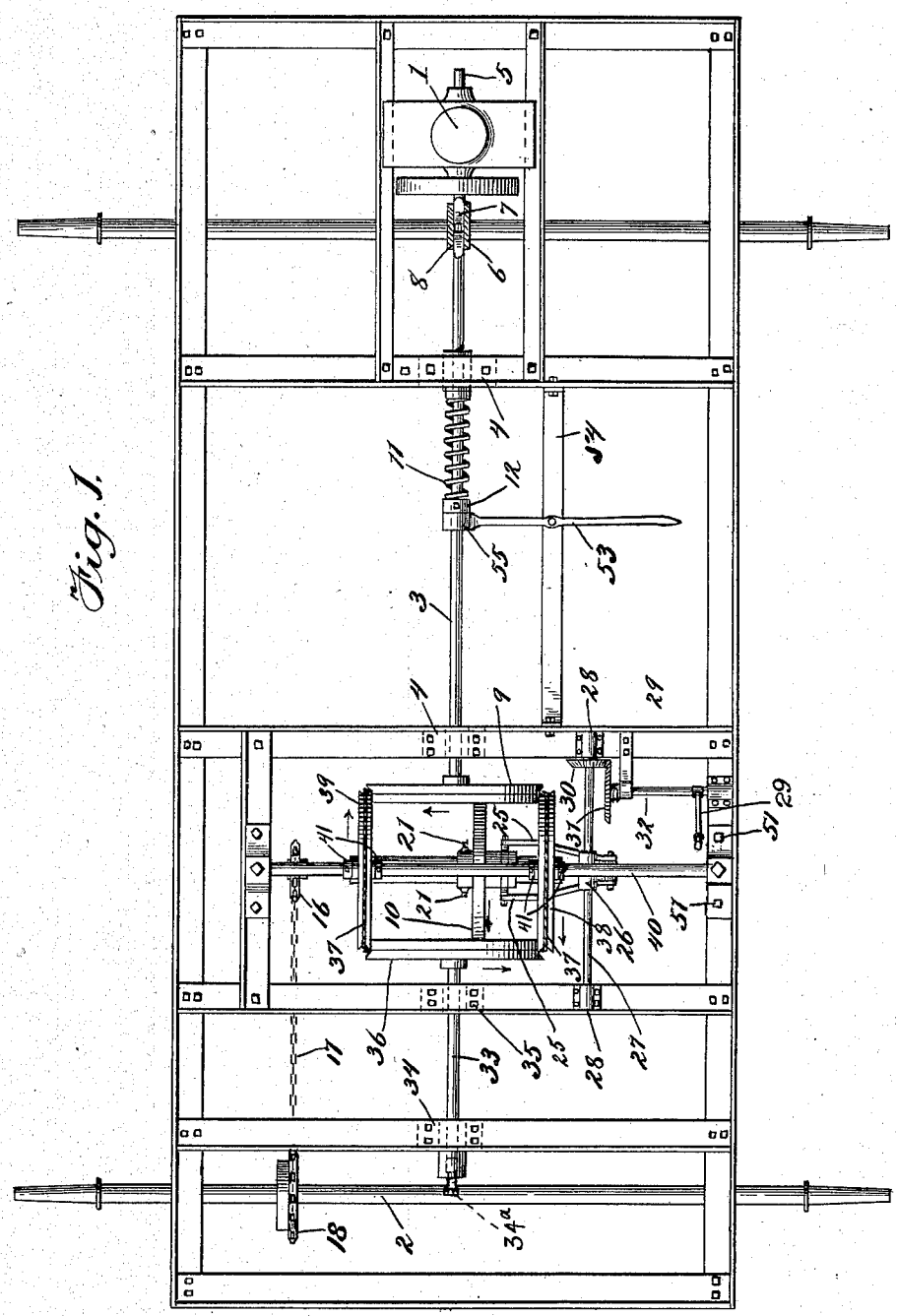

No. 723,295. PATENTED MAR. 24, 1903.
E. T. McKAIG.
POWER TRANSMITTER.
APPLICATION FILED NOV. 26, 1902.
NO MODEL. 2 SHEETS—SHEET 1.

Witnesses
Ira D. Perry
Mrs Allstadt

Inventor:
E. T. McKaig
by Elliott Hopkins
Attys

No. 723,295. PATENTED MAR. 24, 1903.
E. T. McKAIG.
POWER TRANSMITTER.
APPLICATION FILED NOV. 26, 1902.
NO MODEL. 2 SHEETS—SHEET 2.
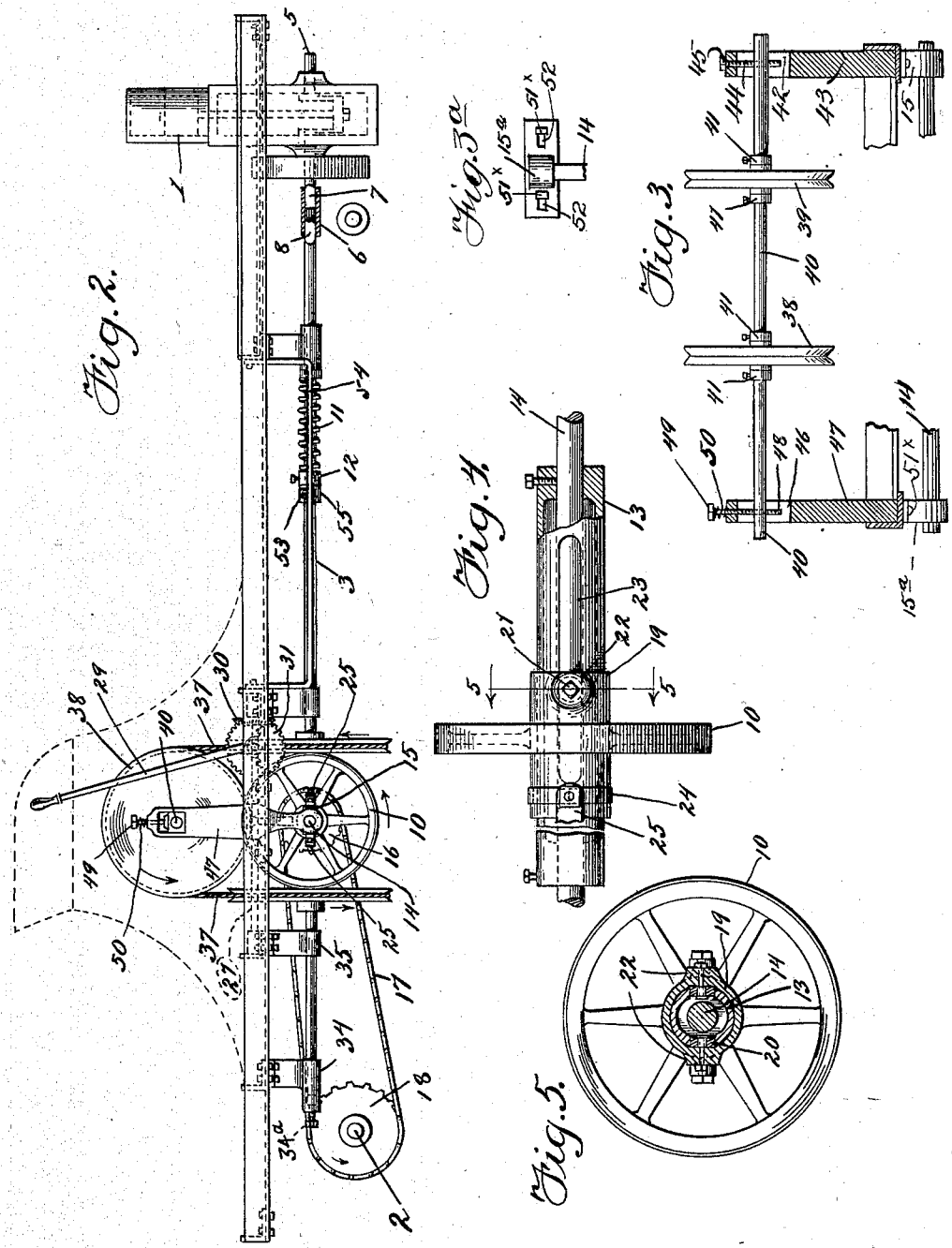
Witnesses: Inventor:
E. T. McKaig
by Elliott & Hopkins attys

UNITED STATES PATENT OFFICE.

EDDY T. McKAIG, OF CHICAGO, ILLINOIS.

POWER-TRANSMITTER.

SPECIFICATION forming part of Letters Patent No. 723,295, dated March 24, 1903.

Application filed November 26, 1902. Serial No. 132,872. (No model.)

*To all whom it may concern:*

Be it known that I, EDDY T. McKAIG, a citizen of the United States, residing at Chicago, in the county of Cook and State of Illinois, have invented certain new and useful Improvements in Power-Transmitters, of which the following is a full, clear, and exact specification.

My invention relates to that class of power-transmitters employed for transmitting power at a variable speed, and more especially to that class also capable of reversing the direction of motion; and my invention has for its primary object to provide means whereby either or both of these results may be accomplished in a feasible and practicable manner with a friction-pulley movable lengthwise of its axis across and bearing against the face of a driving-disk in such a manner that the speed of the pulley will increase in direct ratio as its distance from the center of the disk, its motion reversing when passing from one side of the center to the other.

More specifically stated, the object of my invention is to drive the pulley on both sides simultaneously from the same source of power, so as to double its transmission efficiency and avoid the necessity of undue pressure and friction between the driving-disk and the periphery of the pulley and on the bearings of these members.

A further object of my invention is to adapt a power-transmission device of this character especially for use on automobiles, boats, &c.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a plan view of my improvements as applied to the running-gear of an automobile. Fig. 2 is a side elevation thereof. Fig. 3 is a detail view of two of the belt-sheaves, their shaft, and the shaft-supporting bearings, hereinafter described. Fig. 3ª is a detail view. Fig. 4 is an enlarged detail view, partly in section and partly broken away, of the friction-pulley and its connected parts; and Fig. 5 is a cross-section on the line 5 5, Fig. 4.

As an illustration of the manner of applying my invention I have shown it in connection with the running-gear of an automobile; but it will nevertheless be understood that this is a mere example of the many forms of cars, vehicles, or boats to which it is also applicable.

In this example of the invention, 1 represents the engine, which may be of the explosion or gasolene type, adapted to run always in the same direction, and 2 is a driving axle or shaft which imparts rotary motion to the traction-wheels when applied to an automobile or car or to the propelling device when applied to a boat.

3 is a shaft which is journaled longitudinally of the running-gear in suitable bearings 4 and having one end connected to the engine-shaft 5 by any suitable device that will impart the rotation of the engine-shaft 5 to the shaft 3, while permitting the shaft 3 to slip longitudinally. As an example of such a device I have shown a sleeve 6, having a square interior fitting over a square end 7 on shaft 5, and a similar end 8 on one end of shaft 3, the sleeve 6 being loose on one of these shafts, so that the shaft 3 can go and come longitudinally. The opposite end of shaft 3 is provided with a friction-disk 9, rigidly secured thereto and held against the periphery of a friction-pulley 10 by means of a spring 11, sleeved on shaft 3 and abutting at one end against one of the bearings 4 and at the other end against a collar 12, secured to shaft 3. The friction-pulley 10 is mounted on a shaft 13, which extends transversely of the shaft 3 directly across the center of friction-disk 9 and keyed or otherwise secured to a supporting-shaft 14, which passes through shaft 13 and has its ends journaled in suitable hangers 15, depending from the running gear or frame, one end of the shaft 14 being provided with a suitable gear member, such as a sprocket 16, which is suitably geared to the axle or shaft 2 by chain 17 and sprocket 18. The friction-pulley 10 is provided with an enlarged elongated hub 19, which slides freely on the shaft 13 longitudinally thereof and is provided with some suitable means for compelling shaft 13 to revolve with it. For this purpose I prefer to employ a pair of opposed antifriction-rollers 20, which are journaled on suitable pins 21, secured in bosses 22 on opposite sides of the hub 19. These antifriction-rollers project inwardly into longitudinal slots 23, formed in the shaft 13, which is preferably hollowed out around the shaft 14, as shown in Fig. 4, to leave room for the motion of the antifriction-rollers 20 without rubbing against the shaft 14. These antifriction-rollers 20 and the slots 23 take the place of the ordinary spline-and-groove connection usually employed for a similar purpose, and they possess the advantage of being free from any tendency to bind in the slots or grooves when the pulley 10 is moved longitudinally of the shaft while subjected to rotative power. As a means of thus moving the pulley 10 longitudinally of the shaft 13 at will, so as to vary the speed from the point of rest to the maximum, and vice versa, the hub 19 is provided with a collar 24, rotatably secured thereto in a well-known manner and connected to one end of a yoke 25, whose other end is pivoted to the lower end of an arm 26, whose upper end is secured to a shaft 27, journaled in suitable bearings 28 and operatively connected to a hand-lever 29 by any suitable means, such as a pair of bevel-gears 30 31, the latter of which is secured to a shaft 32, upon which the hand-lever 29 is mounted, so that by rocking the lever 29 in one direction the friction-pulley 10 will be pulled outwardly or toward the right, and by a reverse motion will be pushed toward the left, an intermediate position of the lever 29 leaving the pulley directly on the center of disk 9, where the propelling effect of the disk is neutralized and the pulley remains at rest.

Mounted in axial alinement with the shaft 3 is a shaft 33, journaled in suitable bearings 34 35 on the frame or running-gear, the bearing 34 being a thrust-bearing for holding the shaft 33 against endwise movement, and on the end of shaft 33, opposite thrust-bearing 34, is a friction-disk 36, which is preferably of the same diameter as the friction-disk 9 and fits against the periphery of friction-pulley 10. This friction-disk 36 is driven in unison with the disk 9 from the engine 1 or from any other suitable source of power by any suitable means, its direction of rotation, however, being opposite to that of the disk 9, so that its propelling or rotative effect upon the pulley 10 will be complementary to that of the disk 9. In preference to ordinary spur or bevel gears as a means of thus driving the disk 36 in unison with the shaft 3 I employ a belt 37 and a pair of sheaves 38 39, and the peripheries of the disks 9 and 36 are grooved, so that they also will act as sheaves or pulleys and receive the belt 37, which is preferably a round belt. The sheaves 38 39 also have grooved peripheries, as better shown in Fig. 3, and are loosely mounted upon a cross-shaft 40, each being positioned on said shaft by a pair of collars 41. One end of shaft 40 is supported in a slot 42 in the upper end of a standard 43 on a screw 44, which is threaded transversely in the shaft and passes loosely through the upper end of the standard 43, where it is provided with a shoulder 45, resting upon the end of the standard and constituting a support for the screw and shaft. The opposite end of the shaft 40 is similarly supported in a slot 46, formed in the upper end of a standard 47 by a screw 48, which passes loosely through the upper end of the standard, but whose shoulder 49 instead of being supported directly on the end of the standard is supported on a spring or cushion 50, so that the shaft at one end will be rigidly held against downward movement, while the opposite end will be yieldingly supported against such movement, and both ends will be capable of vertical adjustment for taking up the slack of belt 37, which, as clearly indicated, passes first around the under sides or edges of disks 9 36 and thence upwardly over the upper sides or edges of the pulleys or sheaves 38 39, thereby imparting the motion of disk 9 to disk 36 in the opposite direction.

Sufficient frictional contact between the disk 9 and pulley 10 will be maintained automatically by the spring 11, and the pulley 10 may be adjusted with reference to the disk 36 for taking up lost motion due to wear by shifting the shaft 33 longitudinally, the bearing 34 having a set-screw $34^a$ for that purpose and the standard $15^a$ being adjustably secured by bolts $51^{\times}$ and slots 52 to the frame of the running-gear, so that the shaft 14 may swing to and fro at one end, whereby the pulley 10 will adapt itself automatically to the two friction-disks 9 36.

In some instances it will be desirable to relieve the friction of the disk 9 against the pulley 10, so that the latter may be readily shifted to the center when starting the engine. As a convenient means of accomplishing this a horizontal lever 53 is pivoted to a cross-bar 54 on the under side of the running-gear and has a fork 55 bearing against the collar 12, so as to be capable of compressing spring 11 and pulling disk 9 away from pulley 10 while the lever 29 is being operated to shift pulley 10 to the center.

Having thus described my invention, what I claim as new therein, and desire to secure by Letters Patent, is—

1. In a power-transmitter the combination of two opposed friction-disks, a friction-pulley arranged between said disks and having its periphery engaging with the faces of both of them, a pair of sheaves or pulleys mounted on an axis at an angle to the axis of said disks and a flexible connection passing around the peripheries of said disks and pulleys for transmitting the motion of one of said disks to the other, substantially as set forth.

2. In a power-transmitter the combination of two opposed friction-disks having grooved peripheries, two grooved pulleys mounted on an axis at an angle to the axis of said disks, a belt passing around said disks and pulleys and a friction-pulley arranged between said disks with its periphery engaging the faces of both of the disks, substantially as set forth.

3. In a power-transmitter the combination of two opposed friction-disks, a friction-pulley mounted between and bearing against both of said disks, a shaft mounted transversely of the axis of said disks, pulleys on said shaft, a belt passing around the pulleys on said shaft and said disks, and means for adjusting said shaft vertically, substantially as set forth.

4. In a power-transmitter the combination of a friction-disk, a motor having a shaft, a shaft to which said disk is secured, movable longitudinally toward and from said motor-shaft, a slip connection between said shafts whereby the motion of one is imparted to the other, a spring for forcing said disk-shaft away from the motor-shaft, means for forcing said disk-shaft longitudinally against the pressure of said spring, a friction-pulley having its periphery engaging the face of said disk and movable thereacross, and means for thus moving said pulley at will, substantially as set forth.

EDDY T. McKAIG.

Witnesses:
F. A. HOPKINS,
M. B. ALLSTADT.